April 25, 1961 C. L. RUTHROFF 2,981,837
LOW-LOSS MICROWAVE LIMITER
Filed Dec. 24, 1957
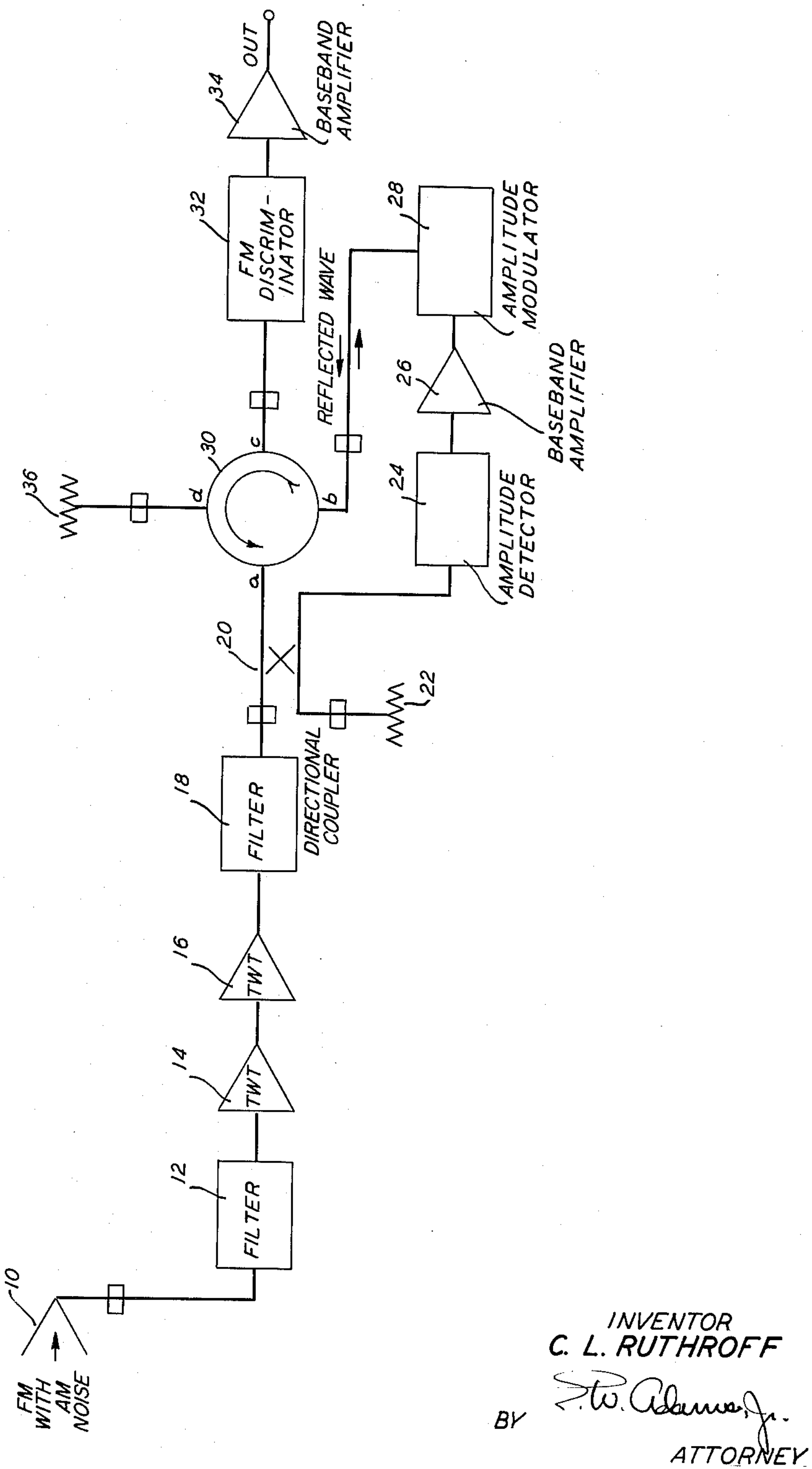
INVENTOR
C. L. RUTHROFF
BY [signature]
ATTORNEY 2,981,837

LOW-LOSS MICROWAVE LIMITER

Clyde L. Ruthroff, Fair Haven, N.J., assignor to Bell Telephone Laboratories, Incorporated, New York, N.Y., a corporation of New York Filed Dec. 24, 1957, Ser. No. 704,930

5 Claims. (Cl. 250—20)

This invention relates to limiter circuits and more particularly to a low-loss limiter for use in microwave frequency modulated receivers wherein the necessary gain is obtained at the microwave frequencies.

In the development of receivers for microwave frequencies, and particularly receivers for use in frequency modulated signals, it has been found possible with the advent of the traveling wave tube to detect the received microwave signals directly to baseband or message signal frequencies. As used herein, the term "baseband" refers to the band of signals by which the radio frequency carrier is modulated. Thus traveling wave tubes operating at the microwave frequencies provide the necessary gain in the receiver and a discriminator, normally employing semiconductor devices, produces a baseband output corresponding to the modulation signals directly from the amplified microwave signals appearing at the output of the traveling wave tube amplifiers. It is inevitable, however, that the received microwave signals will include, in addition to the frequency modulated components, noise voltages which appear as amplitude modulation sidebands upon the microwave carrier. As in other frequency modulated systems, limiting must be performed to eliminate these amplitude modulated components prior to detection of the frequency modulated signal.

In the more common receiver employing intermediate frequency amplification, conventional limiters wherein the received signal is amplified and then clipped or sliced to eliminate all amplitude variations may easily be employed. When this more or less conventional technique is applied to a receiver wherein all gain is provided at the microwave frequencies, the limiter introduces substantial loss in the carrier (and thus the frequency modulated components), thereby dissipating much of the gain introduced by the traveling wave tube amplifiers.

It is accordingly the object of the present invention to limit frequency modulated microwave carrier signals without the introduction of any substantial loss in signal level.

In accordance with the above object, the limiter of the invention involves apparatus for sampling a frequency modulated microwave carrier signal and detecting amplitude modulated components in the sample. The detected output only, which constitutes amplitude modulation signals at baseband frequencies, is amplified in a conventional baseband amplifier and applied after a total phase shift of 180 degrees to modulate the incoming microwave signal prior to frequency discrimination in such a way as to cancel the amplified modulated sidebands thereon.

The above and other features of the invention will be considered in more detail in the following specification taken in connection with the drawing, the single figure of which is a schematic diagram in block form of the significant portions of a microwave receiver embodying the limiter of the invention.

There is shown in the drawing the arrangement of a receiver and limiter according to the invention suited for use in removing amplitude variations from a microwave carrier which is also modulated with a wanted frequency modulation signal. In the high quality transmission systems in which the present limiter is of particular interest, the signal-to-noise ratio is maintained at a level such that the amplitude modulated noise components may be considered the result of low index amplitude modulation. In the receiver, signals from an antenna 10 comprising a microwave carrier having a desired frequency modulation signal modulated thereupon, and in addition, unwanted amplitude modulated sidebands corresponding to noise voltages impressed thereon, are applied through suitable waveguide transmission paths and a filter 12 to the input of a microwave frequency amplifier comprising tandem-connected traveling wave tubes 14 and 16. The amplified microwave signal still bearing both the desired frequency modulation and the undesired amplitude modulated components appears at the output of a filter 18 at which point a small portion or sample of the complex signal is abstracted by any convenient means here shown as a directional coupler 20. The branch circuit of the directional coupler is suitably terminated at one end by a dissipative termination 22 and is connected at the other end to the input of an amplitude detector 24 which may be of any convenient type. For example, this amplitude detector may comprise a semiconductor diode mounted in the type of transmission line, either waveguide or coaxial, employed as the branch circuit of the directional coupler. For the low index amplitude modulation here involved such a detector is linear.

The output of amplitude detector 24, which is specified to consist of only baseband voltages corresponding to the amplitude modulated sidebands upon the microwave carrier, is applied to a baseband amplifier 26 consisting of a sufficient number of conventional stages to increase the level of the noise sideband signals to the required extent as will appear hereinafter. The output of the baseband amplifier is applied to an amplitude modulator 28 which may, as in the case of the amplitude detector 24, be of any convenient type and may, as does detector 24, comprises a semiconductod diode mounted in a transmission line section of appropriate type, here shown as a wave guide.

Also applied to amplitude modulator 28 by way of a one-way transmission path through a four-terminal circulator 30 is the amplified microwave signal which appears at the output of filter 18. This signal appearing at terminal *a* of the circulator is coupled to terminal *b* which is connected to amplitude modulator 28. The impedance as seen at terminal *b* of amplitude modulator 28 is deliberately mismatched to that of the circulator with the result that a large proportion, for example, 80 to 90 percent of the microwave energy applied to amplitude modulator 28, is reflected therefrom and coupled unidirectionally through the circulator to terminal *c*. Terminal *c* of the circulator is connected to a frequency modulation discriminator 32, the output of which is applied to a baseband amplifier 34 in the usual manner. The fourth terminal *d* of the circulator is connected to a termination 36 which prevents coupling of energy reflected from the discriminator to input terminal *a*.

In the operation of the circuit arrangements just described, the portion of the microwave signal not reflected by amplitude modulator 28 provides a carrier which may be amplitude-modulated by the baseband signals appearing at the output of baseband amplifier 26. It will be recognized that such modulation will produce a pair of amplitude modulation sidebands which may combine with the unwanted noise frequency sidebands present upon the microwave carrier reflected through the circulator to discriminator 32. If the gain of the baseband amplifier 26 is made sufficient and if the overall relative phase shift of the new sidebands at the output of amplitude modulator 28 with respect to the amplitude modulation sidebands appearing on the signals applied to terminal *a* of circulator 30 is made 180 degrees, the unwanted sidebands may be substantially completely canceled. The composite signal thus coupled from terminal *b* to terminal *c* of the circulator and thence applied to discriminator 32 carries only frequency modulated components and the required limiting action has been accomplished without significant loss in the level of the microwave signals.

By way of example, let it be assumed that the input power $P_T$ to the limiter (at the output of filter 18) is 10 milliwatts, that the modulation index ($k$) of the amplitude modulation noise component is 10 percent and that directional coupler 20 is a 10 db coupler. Then if the diodes of detector 24 and modulator 28 have a conversion loss of 10 db and the return loss of the diode in the modulator is 3 db, the power incident upon amplitude modulator 28 from terminal $b$ of circulator 30 is 9 milliwatts and the power reflected therefrom to the discriminator 32 is 4.5 milliwatts. Then the total sideband power in the signal applied to the limiter is given by $$P_{sb}=\frac{k^2}{2}P_T=\frac{.01}{2}\times 10=.05 \text{ milliwatt}$$

Now, the total power reaching detector 24 by way of the directional coupler 20 is 1.0 milliwatt and the sideband power at this point is .005 milliwatt. Because of the conversion loss of the detector, the baseband power at the input of amplifier 26 is .0005 milliwatt. If the baseband amplifier 26 has a gain of 26.5 db, the output will be at a level of .225 milliwatt. Since the power reflected from amplitude modulator 28 was found to be 4.5 milliwatts, the amplitude modulation index (representing the noise components remaining at this point) will then be $$k^2=\sqrt{\frac{\text{baseband power}}{\text{carrier power}}}=\sqrt{\frac{.225}{4.5}}$$
$$=.224$$

At the same time the loss introduced in the wanted frequency modulation signal (which is proportional to carrier level) is given by $$L=10 \log \frac{10}{4.5}=3.46 \text{ db}$$

What is claimed is:

1. In a microwave receiver for frequency modulated microwave signals having spurious amplitude modulation sidebands thereon, a frequency modulation discriminator, an input path for said signals, means for detecting amplitude variations in said microwave signals, means for directionally coupling a portion of the signals in said input path to said detecting means, an amplitude modulator, means for applying the output of the detector to said modulator, and means unidirectionally coupling said input path, said modulator, and said discriminator in the order listed to apply the original frequency modulation signals in the input path to said modulator for modulation in accordance with the output of said detecting means and to apply the modulated output from said modulator to said discriminator, the relative phase shift between the spurious amplitude modulation sidebands of the signals applied to said modulator being 180 degrees.

2. A low-loss limiter for frequency modulated microwave signals having spurious amplitude modulation thereon comprising an input channel, an amplitude detector, means for applying a portion of the signal in said input channel to said detector, an amplitude modulator, means for amplifying the output of said detector for application as a modulating signal to said modulator, and means interconnecting the input channel, the amplitude modulator, and an output circuit in the order recited to apply the signal in the input channel as a modulating signal to said modulator and the modulated signal from said modulator to said output channel, the amplitude modulated signals produced by said modulator being in phase opposition to those constituting spurious modulations upon the input signal.

3. In a receiver for frequency modulated microwave signals having spurious amplitude modulation thereon, a microwave amplifier, means for applying incoming microwave signals thereto, a frequency modulation discriminator, and means for suppressing the spurious amplitude modulation on incoming signals prior to application thereof to said discriminator, comprising an amplitude modulation detector, means for directionally coupling a portion of the signal at the output of said microwave amplifier to said detector, an amplitude modulator, means for applying the output of said detector to said modulator, and means unidirectionally coupling the output of said microwave amplifier, said modulator, and said frequency modulation discriminator in the order recited to apply a portion of the signal from said amplifier to said modulator for modulation by the output of the detector and to apply the modulated output from said modulator to said discriminator in phase opposition to the amplitude modulation sidebands on the incoming microwave signal.

4. In a receiver for frequency modulated microwave signals having spurious amplitude modulation thereon, a microwave amplifier, means for applying incoming microwave signals thereto, a frequency modulation discriminator, and means for suppressing the spurious amplitude modulation on incoming signals prior to application thereof to said discriminator, comprising an amplitude modulation detector, means for directionally coupling a portion of the signal at the output of said microwave amplifier to said detector, an amplitude modulator, means for applying the output of said detector to said modulator, a microwave circulator having four terminals, individual means for respectively coupling the first, second, and third terminals of said circulator to the output of said microwave amplifier, said amplitude modulator, and the FM discriminator, and means for terminating the circulator at its fourth terminal, said circulator serving to couple the output of the microwave amplifier to said amplitude modulator and the output of the amplitude modulator to said discriminator, the total phase shift between the sidebands of the signal at the output of said microwave amplifier and those at the output of the amplitude modulator being 180 degrees.

5. In a receiver for frequency modulated microwave signals having spurious amplitude modulation thereon, a microwave amplifier, means for applying incoming microwave signals thereto, a frequency modulation discriminator, and means for suppressing the spurious amplitude modulation on incoming signals prior to application thereof to said discriminator, comprising an amplitude modulation detector, means for directionally coupling a portion of the signal at the output of said microwave amplifier to said detector, an amplitude modulator, means for applying the output of said detector to said modulator, a microwave circulator having four terminals, means for coupling the output of said microwave amplifier to the first terminal of said circulator, transmission means between the second terminal of said circulator and said amplitude modulator, the impedance match between said last-mentioned two elements being such that a major fraction of the energy reaching the amplitude modulator is reflected back to said circulator, means connecting the third terminal of said circulator to said discriminator, and means terminating said circulator at its fourth terminal, the total relative phase shift between the amplitude modulation sidebands reaching said discriminator from said microwave amplifier and those reaching said discriminator from said amplitude modulator being 180 degrees.

References Cited in the file of this patent

UNITED STATES PATENTS

| | | |
|---|---|---|
| 1,914,219 | Simonds | June 13, 1944 |
| 2,379,688 | Crosby | July 3, 1945 |
| 2,441,598 | Robertson | May 18, 1948 |
| 2,570,893 | Wilkes | Oct. 9, 1951 |
| 2,652,541 | Cutler | Sept. 15, 1953 |